(12) United States Patent
Henderson et al.

(10) Patent No.: US 11,768,275 B2
(45) Date of Patent: Sep. 26, 2023

(54) STROBE WINDOW DEPENDENT ILLUMINATION FOR FLASH LIDAR

(71) Applicants: The University Court of The University of Edinburgh, Edinburgh (GB); Sense Photonics, Inc., Durham, NC (US)

(72) Inventors: Robert Henderson, Edinburgh (GB); Tarek Al Abbas, Edinburgh (GB); Neil Calder, Edinburgh (GB); Hod Finkelstein, Berkeley, CA (US)

( * ) Notice: Subject to any disclaimer, the term of this patent is extended or adjusted under 35 U.S.C. 154(b) by 901 days.

(21) Appl. No.: 16/778,476

(22) Filed: Jan. 31, 2020

(65) Prior Publication Data

US 2020/0249318 A1 Aug. 6, 2020

Related U.S. Application Data

(60) Provisional application No. 62/908,801, filed on Oct. 1, 2019, provisional application No. 62/799,116, filed on Jan. 31, 2019.

(51) Int. Cl.
*G01S 7/48* (2006.01)
*G01S 7/484* (2006.01)
*G01S 17/931* (2020.01)
*G01S 7/481* (2006.01)

(52) U.S. Cl.
CPC .......... *G01S 7/484* (2013.01); *G01S 7/4814* (2013.01); *G01S 17/931* (2020.01)

(58) Field of Classification Search
None
See application file for complete search history.

(56) References Cited

U.S. PATENT DOCUMENTS

| 7,544,945 B2 | 6/2009 | Tan et al. |
| 8,736,818 B2 | 5/2014 | Weimer et al. |
| 10,140,534 B2 * | 11/2018 | Kitchens, II ............. A61B 8/54 |
| 2015/0131080 A1 | 5/2015 | Retterath et al. |
| 2015/0219764 A1 | 8/2015 | Lipson |

(Continued)

FOREIGN PATENT DOCUMENTS

| DE | 19947023 A1 * | 5/2001 | ........... G01S 17/026 |
| KR | 10-2018-0049937 A | 5/2018 | |
| WO | 2017003682 A2 | 1/2017 | |

OTHER PUBLICATIONS

Extended European Search Report Corresponding to European Application No. 20748881.8 (7 pages) (dated Aug. 2, 2022).

(Continued)

*Primary Examiner* — Hovhannes Baghdasaryan
(74) *Attorney, Agent, or Firm* — Myers Bigel, P.A.

(57) ABSTRACT

A Light Detection And Ranging (LIDAR) system includes one or more emitter elements configured to emit optical signals responsive to respective emitter control signals, one or more detector elements configured to detect incident photons for respective strobe windows of operation between pulses of the optical signals and at respective delays that differ with respect to the pulses, and at least one control circuit. The at least one control circuit is configured to generate the respective emitter control signals to differently operate the one or more emitter elements based on the respective strobe windows of operation of the one or more detector elements.

20 Claims, 11 Drawing Sheets

(56) References Cited

U.S. PATENT DOCUMENTS

| | | |
|---|---|---|
| 2017/0248796 A1 | 8/2017 | Banks et al. |
| 2018/0246189 A1 | 8/2018 | Smits |
| 2018/0267250 A1 | 9/2018 | Hosseini et al. |
| 2018/0301589 A1 | 10/2018 | Burroughs et al. |
| 2018/0301872 A1 | 10/2018 | Burroughs et al. |
| 2018/0301875 A1 | 10/2018 | Burroughs et al. |
| 2018/0329204 A1 | 11/2018 | Smits |

OTHER PUBLICATIONS

Notification of Transmittal of the International Search Report and the Written Opinion of the International Searching Authority, or the Declaration, in corresponding PCT Application No. PCT/US2020/016015 (dated May 28, 2020).

\* cited by examiner

STROBE WINDOW DEPENDENT ILLUMINATION FOR FLASH LIDAR

CLAIM OF PRIORITY

This application claims the benefit of priority from U.S. Provisional Patent Application No. 62/799,116, filed Jan. 31, 2019, and from U.S. Provisional Patent Application No. 62/908,801, filed Oct. 1, 2019 in the United States Patent and Trademark Office, the disclosures of which are incorporated by reference herein in their entireties.

FIELD

The present application present disclosure relates generally to imaging, and more specifically to Light Detection And Ranging (LIDAR)-based imaging.

BACKGROUND

Flash-type LIDAR (also referred to herein as lidar), which can use a pulsed light emitting array to emit light for short durations over a relatively large area to acquire images, may allow for solid-state imaging of a large field of view or scene (e.g., a field of view of about 120 to 180 degrees or more). However, to illuminate such a large field of view (which may include long range and/or low-reflectance targets and in bright ambient light conditions) and still receive a recognizable return or reflected optical signal therefrom (also referred to herein as an echo signal), higher optical emission power may be required, which may be inefficient and/or undesirable.

That is, higher emission power (and thus higher power consumption) may be required in some applications due to the relatively high 'background' noise levels from ambient and/or other non-LIDAR emitter light sources (also referred to therein as a noise floor). This can be problematic in some applications, e.g., unmanned aerial vehicle (UAV), automotive, industrial robotics. For example, in automotive applications, the increased emission power requirements must be met by the car's power supply, which may add a considerable load for car manufacturers. Thus, demand from the LIDAR automotive market may be primarily directed to low power systems. Also, heat generated from the higher emission power may alter the optical performance of the light emitting array and/or may negatively affect reliability.

SUMMARY

Some embodiments described herein provide methods, systems, and devices including electronic circuits providing a LIDAR system including one or more emitter elements (including one or more light emitting devices or lasers, such as surface- or edge-emitting laser diodes; generally referred to herein as emitters, which output emitter signals in response to emitter control signals) and one or more light detector elements (including one or more photodetectors, such as photodiodes, including avalanche photodiodes and single-photon avalanche detectors; generally referred to herein as detectors, which output detection signals in response to incident light), and one or more control circuits that are configured to selectively operate subsets of the emitter elements based on a position thereof in the emitter array, and/or to adjust respective power levels of the optical signals emitted by one or more of the emitter elements, based on respective strobe windows of operation of one or more of the detector elements. The respective strobe windows may correspond to respective sub-ranges of an imaging distance range that is based on a time between pulses of the optical signals. The respective strobe windows may correspond to respective acquisition subframes of the detector elements, where each acquisition subframe may collect data for a different strobe window.

According to some embodiments, a Light Detection And Ranging (LIDAR) system includes one or more emitter elements configured to emit optical signals responsive to respective emitter control signals, one or more detector elements configured to detect incident photons for respective strobe windows of operation between pulses of the optical signals and at respective delays that differ with respect to the pulses, and at least one control circuit. The at least one control circuit is configured to generate the respective emitter control signals to differently operate the one or more emitter elements (e.g., in terms of peak output power, density of active emitters, and/or position in an array), based on the respective strobe windows of operation of the one or more detector elements.

In some embodiments, the respective emitter control signals operate the one or more emitter elements to emit the optical signals at a first power level for a first strobe window of the respective strobe windows, and to emit the optical signals at a second power level for a second strobe window of the respective strobe windows.

In some embodiments, the first strobe window corresponds to a closer sub-range of a distance range that that is based on a time between the pulses of the optical signals than the second strobe window, and the second power level is greater than the first power level.

In some embodiments, the one or more emitter elements include first and second emitter elements positioned at respective regions of an emitter array, and the respective emitter control signals operate the first and second emitter elements to emit the optical signals at the first and second power levels for the first and second strobe windows, respectively. For example, the respective emitter control signals may operate the first emitter elements to emit the optical signals at a first range of power levels comprising the first power level for the first strobe window, and may operate the second emitter elements to emit the optical signals at a second range of power levels comprising the second power level for the second strobe window. The first emitter elements may occupy a greater portion of the emitter array than the second emitter elements.

In some embodiments, the one or more emitter elements include first and second subsets of emitter elements, and the respective emitter control signals operate the first subset to emit the optical signals for a first strobe window of the respective strobe windows, and operate the second subset to emit the optical signals for a second strobe window of the respective strobe windows.

In some embodiments, the first and second subsets are positioned at different regions of an emitter array and/or include different densities of the emitter elements.

In some embodiments, the respective emitter control signals operate the first subset to emit the optical signals having a first power level for the first strobe window, and operate the second subset to emit the optical signals having a second power level for the second strobe window, where the second power level is greater than the first power level.

In some embodiments, the first strobe window corresponds to a closer sub-range of a distance range that that is based on a time between the pulses of the optical signals than the second strobe window.

In some embodiments, the second subset includes fewer of the emitter elements than the first subset.

In some embodiments, the first subset includes emitter elements that are positioned at a peripheral region of the emitter array, and the second subset includes emitter elements that are positioned at a central region of the emitter array.

In some embodiments, the first strobe window includes a first set of strobe windows corresponding to a first set of the respective sub-ranges of the distance range, and the second strobe window includes a second set of strobe windows corresponding to a second set of the respective sub-ranges of the distance range.

According to some embodiments, at least one control circuit is configured to output respective emitter control signals to operate one or more emitter elements of an emitter array to emit first optical signals at a first power level for a first strobe window of operation of one or more detector elements of a detector array, and to emit second optical signals at a second power level, different than the first power level, for a second strobe window of operation of the one or more detector elements. The first and second strobe windows correspond to respective sub-ranges of a distance range that is based on (e.g., shorter or equal to the distance traversed by light during) the time between pulses of the optical signals.

In some embodiments, the first strobe window corresponds to a closer sub-range of the respective sub-ranges than the second strobe window, and the second power level is greater than the first power level.

In some embodiments, the one or more emitter elements include first and second subsets of emitter elements, and the respective emitter control signals operate the first subset to emit the first optical signals at the first power level for the first strobe window, and operate the second subset to emit the second optical signals at the second power level for the second strobe window. The emitter control signals may operate the emitter elements to reduce the output power of the optical signals during strobe windows that correspond to closer sub-ranges of the distance range, and increase the output power of the optical signals during strobe windows that correspond to farther sub-ranges of the distance range.

In some embodiments, the first and second subsets are positioned at different regions of an emitter array and/or include different densities of the emitter elements.

In some embodiments, the second subset includes fewer of the emitter elements than the first subset.

In some embodiments, the distance range includes a first distance range corresponding to a first time between pulses of the first optical signals, and a second distance range corresponding to second time between pulses of the second optical signals.

According to some embodiments, at least one control circuit is configured to output respective emitter control signals to operate a first subset of emitter elements (e.g., positioned at a first region of an emitter array and/or including a first density of the emitter elements) to emit optical signals for a first set of strobe windows of operation of detector elements of a detector array, and to operate a second subset of the emitter elements, which is different than the first subset (e.g., positioned at a second region of the emitter array and/or including a second density of the emitter elements), to emit the optical signals for a second set of strobe windows of operation of the detector elements. The strobe windows correspond to respective sub-ranges of a distance range that is based on (e.g., shorter or equal to the distance traversed by light during) a time between pulses of the optical signals.

In some embodiments, the first subset includes emitter elements positioned at a first region of the emitter array, and the second subset includes emitter elements positioned at a second region of the emitter array that is different from the first region.

In some embodiments, the first region includes a peripheral region of the emitter array, and the second region includes a central region of the emitter array.

In some embodiments, the respective emitter control signals are configured to operate the first subset of the emitter elements to emit the first optical signals at a first power level, and to operate the second subset of the emitter elements to emit the second optical signals at a second power level.

In some embodiments, the first strobe window corresponds to a closer sub-range of the respective sub-ranges than the second strobe window, and the second power level is greater than the first power level.

In some embodiments, the second subset includes fewer of the emitter elements than the first subset.

In some embodiments, the first strobe window includes a first set of strobe windows, and the second strobe window includes a second set of strobe windows. The first set of the strobe windows may be a subset of the second set of strobe windows and/or the second power level may be greater than the first power level.

In some embodiments, the LIDAR system is configured to be coupled to an autonomous vehicle such that the one or more emitter elements and the one or more detector elements are oriented relative to an intended direction of travel of the autonomous vehicle.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1:
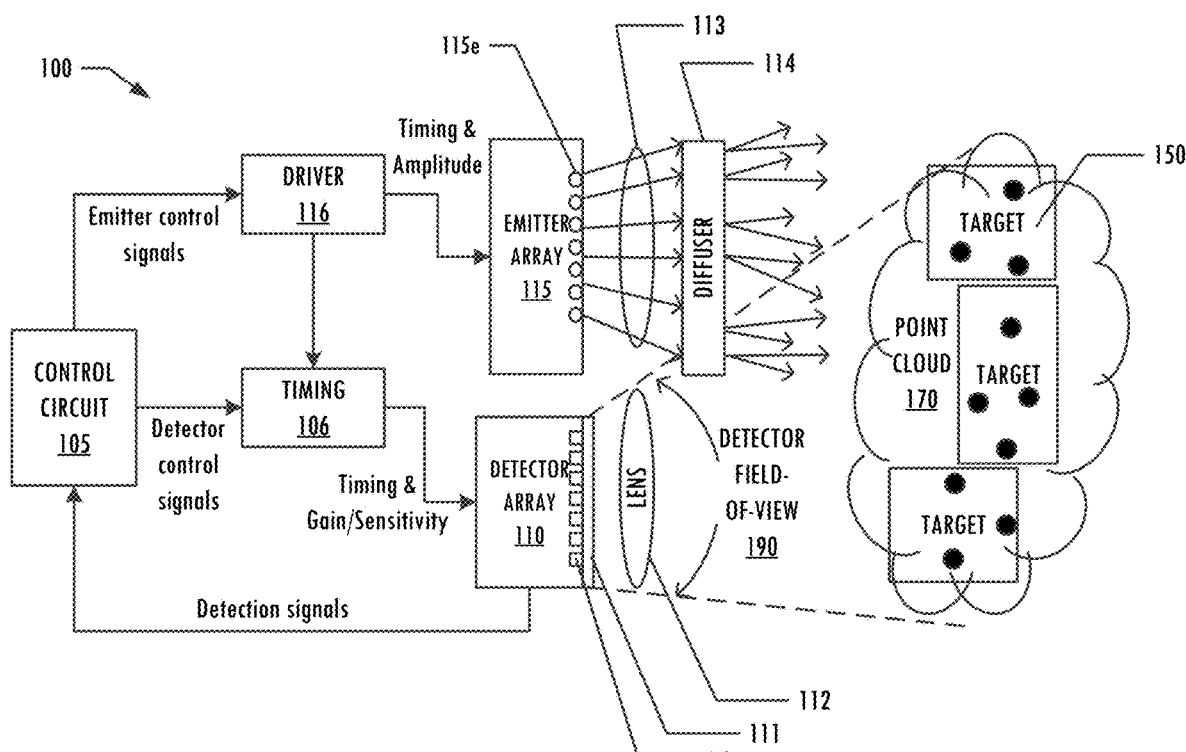
FIG. 1 is a block diagram illustrating an example lidar system or circuit that is configured to provide strobe window dependent emitter control in accordance with some embodiments of the present disclosure.

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array, or a subset of the array, of emitter elements for short durations (pulses) over a field of view (FOV) or scene. A non-flash or scanning lidar system may generate image frames by raster scanning light emission (continuously) over a field of view or scene, for example, using a point scan or line scan to emit the necessary power per point and sequentially scan to reconstruct the full field of view FOV.

Some embodiments described herein arise from recognition that while flash LIDAR systems may require higher optical emission power to illuminate a full field of view or scene (e.g., compared to scanning LIDAR), each portion (point) of the field of view/scene receives a fraction of the power output from the emitters (also referred to herein as emitter power or output signal power). While overall LIDAR system power derives from both emitter and receiver power requirements, and while both can be addressed by improved or optimized designs, some embodiments described herein are described primarily with reference to adaptive illumination schemes that can reduce emitter power in flash LIDAR operation. However, it will be understood that the adaptive illumination schemes described herein may be similarly applicable to scanning LIDAR operations, for example, when scanning is implemented electronically by sequential activation of rows/columns of the emitters of emitter arrays described herein, and/or in a "scanning flash" implementation where an array of beams output from emitters are scanned across the scene (e.g., using micro-electromechanical systems).

In embodiments described herein, a detection window or detector strobe window may refer to the respective durations of activation and deactivation of one or more detectors (e.g., responsive to respective strobe signals from a control circuit) over the temporal period or time between pulses of the emitter(s) (which may likewise be responsive to respective emitter control signals from a control circuit). The time between pulses (which defines a laser cycle, or more generally emitter pulse frequency) may be selected or may otherwise correspond to a desired imaging distance range for the LIDAR system. Each strobe window may be differently delayed relative to the emitter pulses, and thus may correspond to a respective portion or sub-range of the distance range. Each strobe window may also correspond to a respective image acquisition subframe (or more particularly, point cloud acquisition subframe, generally referred to herein as a subframe) of an image frame. That is, each image frame includes a plurality of subframes, each of the subframes samples or collects data for a respective strobe window over the temporal period, and each strobe window covers or corresponds to a respective distance sub-range of the distance range. Range measurements and strobe window sub-range correspondence as described herein are based on time of flight of an emitted pulse. Some traditional strobing techniques (e.g., as described in U.S. Patent Application Publication No. 2017/0248796 to Banks et al.) may measure distance based on the strobe window from which an echo is received.

Some emitter power management schemes (e.g., as described in U.S. Pat. No. 8,736,818 to Weimer et al.) may use a first illumination pattern to illuminate a scene to identify regions of interest (ROI) with potential targets, and may use a second illumination pattern (e.g., a selective activation of emitters) tailored to the identified ROIs to determine target range. Other emitter power management schemes (e.g., as described in U.S. Pat. No. 7,544,945 to Tan et al.) may describe zonal illumination.

Figure 7:
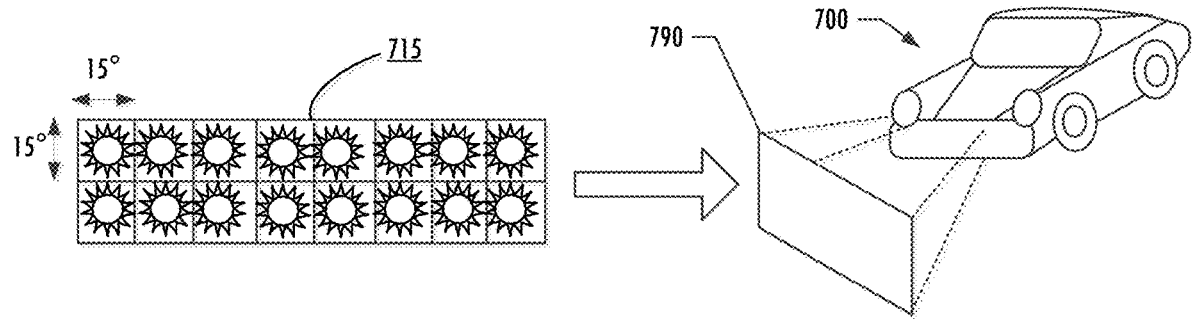
FIG. 7 is a block diagram illustrating an illumination pattern provided by some flash lidar systems.

Illumination provided by some flash LIDAR systems is shown in FIG. 7. The system 700 of FIG. 7 provides a wide FOV 790 over a distance range, for example, a 120° (horizontal)×30° (vertical) FOV (which may be divided into 15°×15° regions or zones) covering a 200 meter (m) distance range (relative to the emitter/detector of the LIDAR system). Such a system may operate by equally flooding the FOV with active illumination (e.g., as provided by laser pulses output from an emitter), both spatially (covering the full FOV with equal intensity) and temporally (covering the full FOV equally throughout period of operation).

Figure 8:
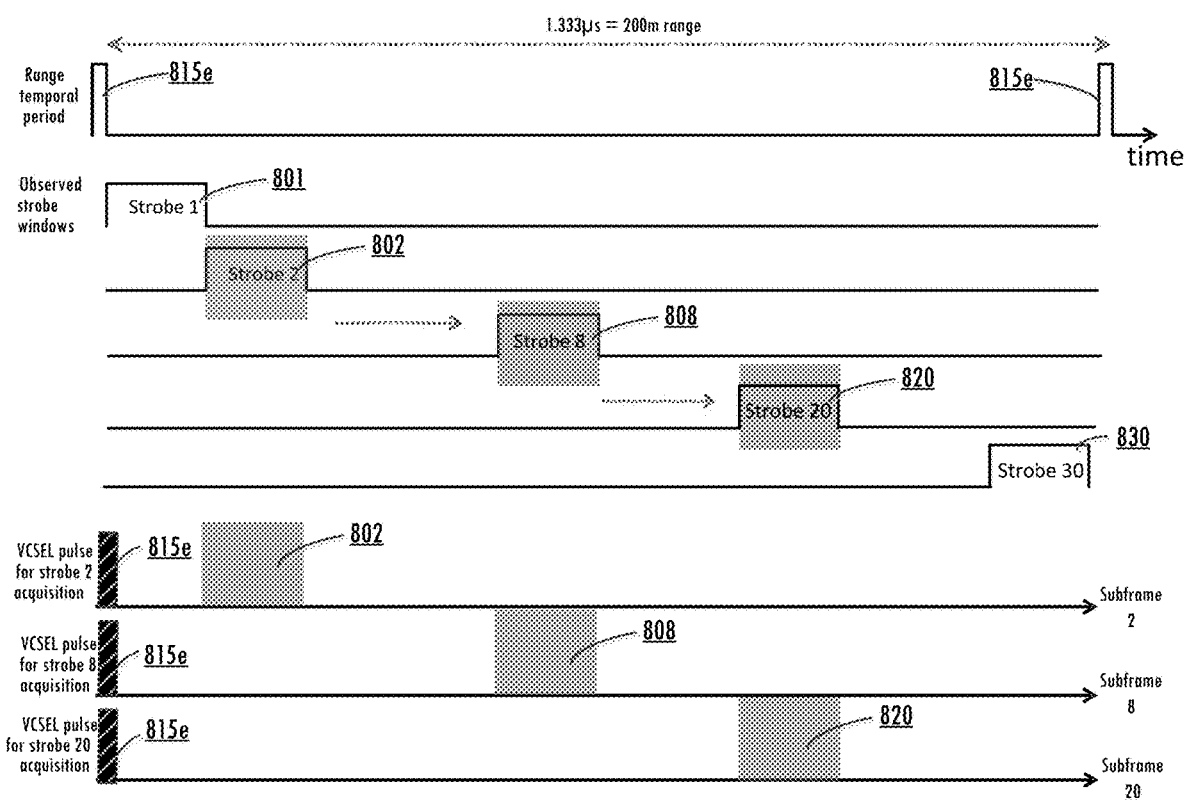
FIG. 8 is a timing diagram illustrating example relative timings between pulses of an emitter signal, strobe windows of detector operation, and power levels of the emitter signal of some flash lidar systems.

As noted above, the emitter pulse frequency of a LIDAR system may be selected or may otherwise correspond to the desired imaging distance range. For example, as shown in FIG. 8, an emitter pulse frequency of about 750 kHz (and thus, a temporal period of 1.333 microseconds (μs) between laser pulses 815e) may be selected to image a 200 m distance range. In the example of FIG. 8, the emitter(s) are operated (e.g., responsive to control signals from one or more control circuits described herein) to emit pulsed optical signals 815e at the beginning of each temporal period. The sensor or detector is operated (e.g., responsive to strobe signals from one or more control circuits described herein) so as to divide the 1.333 μs temporal period into 2-50 strobe windows (illustrated as 30 strobe windows 801-830), and to sequentially cycle through acquisitions (or more particularly, point-cloud acquisition subframes) for each of the strobe windows. The strobe window ranges can be monotonically increasing or otherwise (e.g., to reduce or minimize heating). In the example of FIG. 8, regardless or irrespective of which strobe window is being used for a particular acquisition, a VCSEL may be operated such that the output optical signals have the same power level, that is, the emission power may be uniformly applied to the emitter(s) for each strobe window. In particular, in FIG. 8, the VCSEL emission power of the pulses 815e may be the same for strobe window 802 and 808 and 820, regardless of the respective sub-range of the 200 m distance covered by each strobe window.

Return or reflected optical signal power typically decreases with increasing target distance, e.g., with the square root of the target distance. In particular, for a fixed emitter pulse power, the return or echo signal pulse power for a strobe window corresponding to a closer sub-range of the defined distance range for the system (e.g., within strobe 2) is much greater than the return pulse power for a strobe window corresponding to a farther sub-range of the defined distance range (e.g., within strobe 50).

Some embodiments of the present disclosure arise from realization that some illumination schemes may be suboptimal, in that more emitter power than necessary may be used when observing nearby strobe windows (i.e., when imaging subframes to collect data for strobe windows corresponding to nearer sub-ranges of the distance range), as the return signal pulse power is already high, which may result in unnecessarily high overall system power. For example, in FIG. 8, assuming for a 10 fps (frames per second) system, with laser cycles per strobe=250, VCSEL pw (pulse width)=10 ns, peak power=65 kW, Rep rate (or laser cycles)=750 kHz. This results in very high electrical power consumption.

Embodiments of the present disclosure provide emitters and associated control circuits that smartly or adaptively adjust the emitter output power (e.g., based the peak output power of one or more emitters, the density of emitters that are active, and/or the position of the emitters in an array) based on a respective strobe window of operation of one or more detectors over the time between optical signal pulses of the emitter(s), for example, based on a distance sub-range corresponding to a respective strobe window of one or more detectors. In particular embodiments, respective emitter control signals may be applied to the emitter(s) so as to output different optical signal power levels for different image acquisition subframes of the detector(s), where each subframe collects data for a different strobe window (and thus respective distance sub-range corresponding to the strobe window). In some embodiments, the different optical signal power levels may be different non-zero power levels, while in other embodiments one of the different optical signal power levels may include zero power (i.e., emitter off-states). A sequencer circuit or other control circuit may be configured to coordinate output of the respective emitter control signals to increase or decrease the optical signal power level output from the emitter(s) with the output of the respective strobe signals, which activate/deactivate the detector(s) for the strobe windows that correspond to different distance sub-ranges.

An example of a lidar system or circuit 100 that may operate in accordance with embodiments of the present disclosure is shown in FIG. 1. The lidar system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit optical illumination pulses or continuous wave signals (generally referred to herein as optical signals or emitter signals) at a time and frequency controlled by a timing generator or driver circuit 116. In particular embodiments, the emitters 115e may be pulsed light sources, such as LEDs or lasers (such as vertical cavity surface emitting lasers (VCSELs)). The optical signals are reflected back from a target 150, and sensed by detector pixels defined by one or more detector elements 110d of the detector array 110. The control circuit 105 may implement a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e, for example, by controlling the peak drive current to the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude/power level of the optical signals that are output from the emitters 115e.

In some embodiments, a receiver/detector module or circuit 110 includes an array of detector pixels (with each detector pixel including one or more detectors 110d, e.g., SPADs), receiver optics 112 (e.g., one or more lenses to collect light over the FOV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FOV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity. When the detector elements 110d include integrating devices such as a CCD, CMOS photogate, and/or photon mixing device (pmd), the charge integration time may be adjusted such that a longer integration time translates to higher sensitivity.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1.

The simultaneous emission of optical signals from multiple emitters 115e provides a single image frame for the flash LIDAR system. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example. In some embodiments, the light emission from individual emitters 115e is not mixed with that of other emitters 115e. In some embodiments, the light emission from individual emitters 115e is mixed, e.g., by using a diffuser 114, but some spatial correlation is maintained between the emission profile of individual emitter elements 115e and the diffused light illuminating the scene. Without loss of generality, embodiments described herein assume that the diffuser 114 shown in FIG. 1 is not present. In some embodiments, all the emitters 115e are activated simultaneously. Reflected signals from various targets are detected upon return to and incidence on the detectors 110d of the detector array 110.

In some embodiments, the control circuit 105, which may include one or more microcontrollers or microprocessors, provides different control signals to the driver circuitry 116 of different emitters 115e in coordination with providing different detector control signals (e.g., strobe signals) to the timing circuitry 106 of different detectors 110d, so as to differently operate the emitters 115e based on respective distance sub-ranges corresponding to respective strobe windows of operation of the detectors 110d to detect the echo signals from the target 150. For example, some embodiments may achieve power savings by operating the subsets of the emitters 115e with different output power levels, different emitter densities, and/or at different spatial positions of the emitters in the emitter array, based on the strobe signals applied to operate the detectors 110d for the respective strobe windows.

Figure 2:
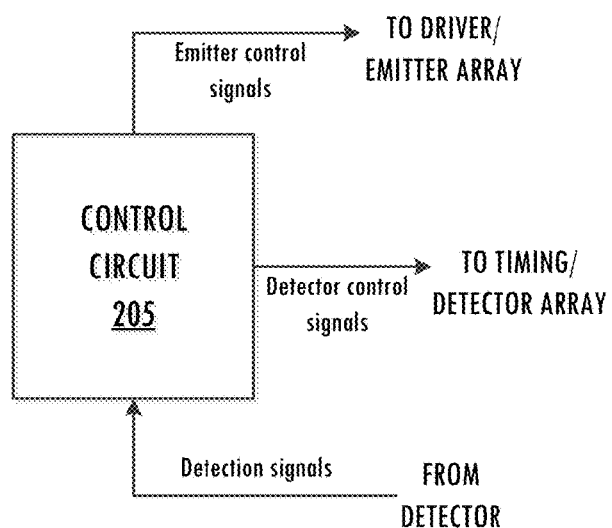
FIG. 2 is a block diagram illustrating an example lidar control circuit in accordance with some embodiments of the present disclosure.

An example of a control circuit 205 that generates emitter and/or detector control signals is shown in FIG. 2. The control circuit 205 of FIG. 2 may represent one or more control circuits, for example, an emitter control circuit that is configured to provide the emitter control signals to the driver circuitry 116 of the emitter array 115 and/or a detector control circuit that is configured to provide the strobe signals to the timing circuitry 106 of the detector array 110 as described herein. 'Strobing' as used herein may refer to the generation of detector control signals (also referred to herein as strobe signals or 'strobes') to control the timing and/or duration of activation (detection or strobe windows) of one or more detectors 110d of the lidar system 100. For example, the detector control signals output from the control circuit 205 may be provided to a variable delay line of the timing circuitry 106, which may generate and output the strobe signals with the appropriate timing delays to the detector array 110.

Also, the control circuit 205 may include a sequencer circuit that is configured to coordinate operation of the emitters 115e and detectors 110d. More generally, the control circuit 205 may include one or more circuits that are configured to generate the respective strobe signals that control the timing and/or durations of activation of the detectors 110d for the respective strobe windows between the pulses of the optical signals from the emitters 115e, and to generate respective emitter control signals that control the output of the optical signals from one or more of the emitters 115e (e.g., based on respective positions thereof the array 115 and/or to adjust the power levels of the optical signals output therefrom) based on the distance sub-ranges corresponding to the respective strobe windows of activation of the detectors 110d between the pulses of the optical signals from the emitters 115e, responsive to the respective strobe signals.

Figure 3A:
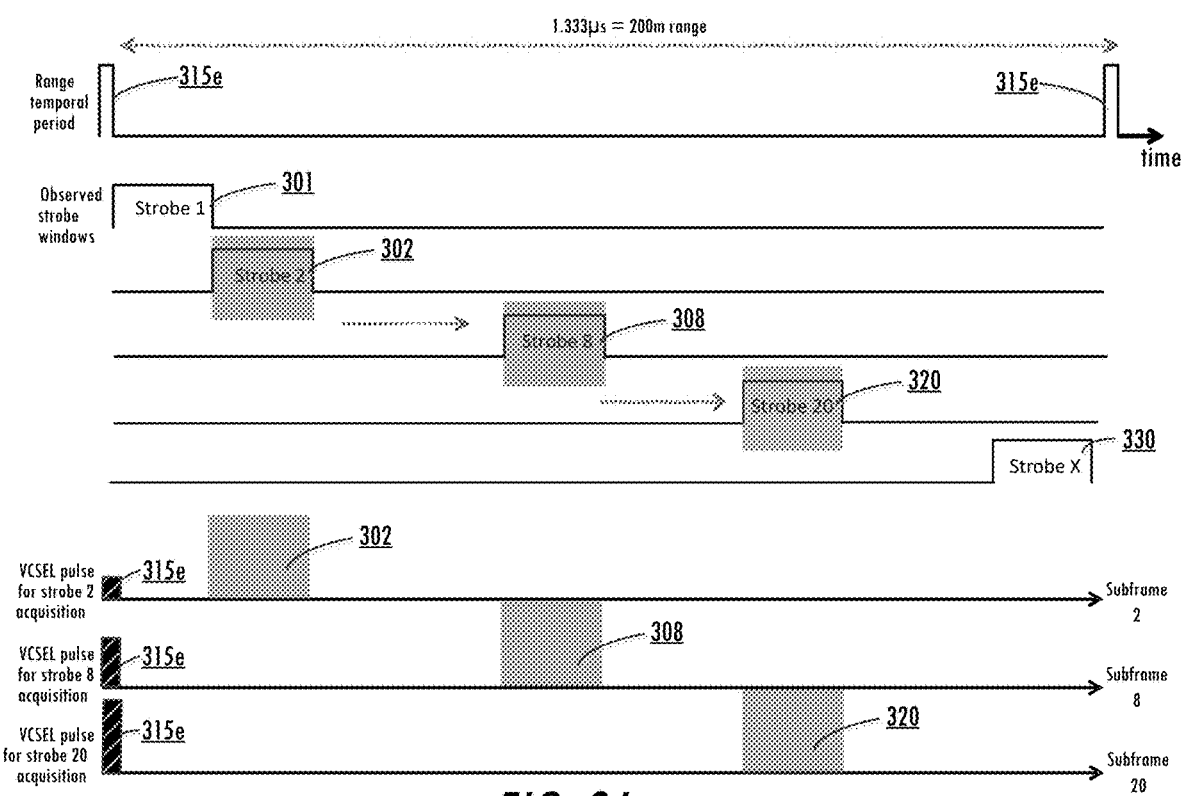
FIG. 3A is a timing diagram illustrating example relative timings between pulses of an emitter signal, strobe windows of detector operation, and power levels of the emitter signal in accordance with some embodiments of the present disclosure.
Figure 3B:
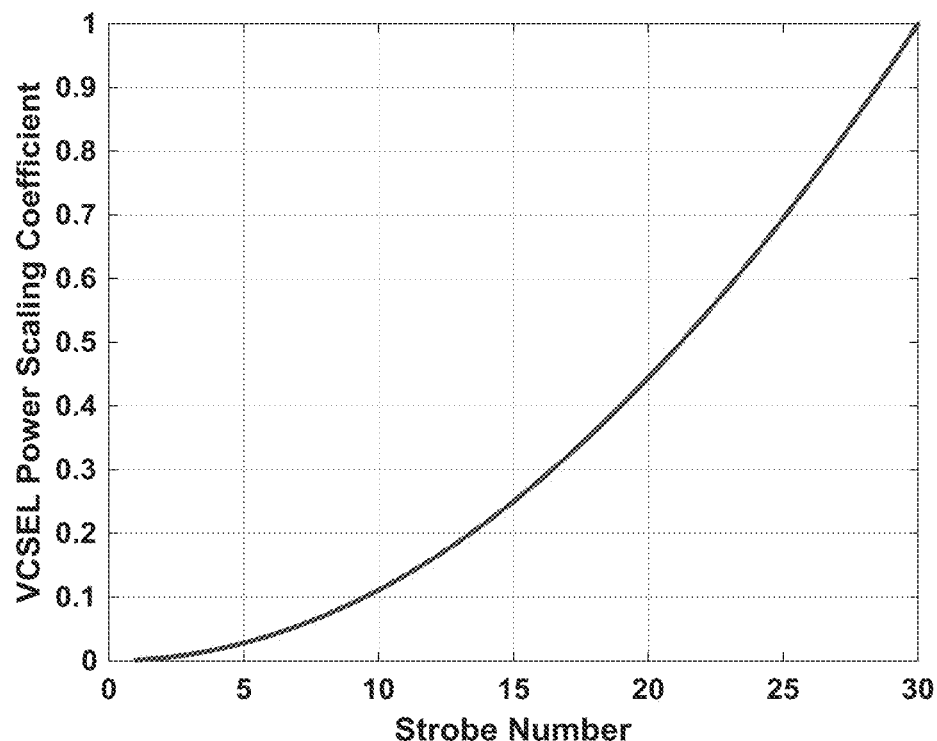
FIG. 3B is a graph illustrating example operations for increasing output signal power for strobe windows corresponding to increasing distance sub-ranges in accordance with some embodiments of the present disclosure.
Figure 3C:
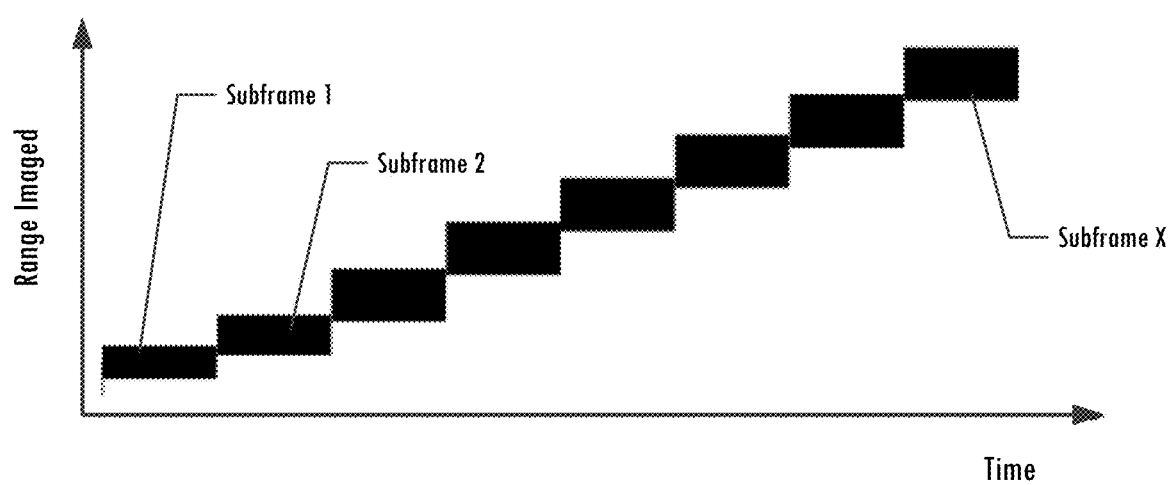
FIG. 3C is a graph illustrating the timings of image acquisition subframes that define a full image acquisition frame in accordance with some embodiments of the present disclosure.

FIG. 3A is a timing diagram illustrating relative timings between pulses of an optical signal output from the emitters (shown by way of example with reference to pulses of a laser signal, also referred to as laser pulses), strobe windows of detector operation, and power levels of the optical signal (also referred to herein as output signal power) in accordance with some embodiments of the present disclosure. FIG. 3B is a graph illustrating operations for increasing output signal power for strobe windows corresponding to increasing distance sub-ranges. FIG. 3C is a graph illustrating the timings of image acquisition subframes that define a full image acquisition frame. The operations illustrated in FIGS. 3A and 3B may be performed in response to control signals (such as emitter control signals and detector strobe signals) generated by one or more control circuits, such as the control circuits 105, 205 described herein.

In the example of FIG. 3A, the emitter control signals operate one or more VCSELs of an emitter array to reduce the power level of the laser pulses 315e for strobe windows corresponding to nearby targets/closer sub-ranges of the distance range (which may correspond to the temporal period between laser pulses), and/or to increase the power level of the laser pulses 315e for strobe windows corresponding to far targets/farther sub-ranges of the defined distance range. As noted above, the laser cycle or temporal period between laser pulses 315e (which is the inverse of the frequency or rep rate of the laser pulses 315e) may be determined based on the farthest allowed target, that is, based on the desired imaging distance range.

As shown in FIG. 3A, to image targets at a distance of about 200 m, a range temporal period of about 1.333 microseconds between laser pulses 315e may be used, which corresponds to a laser frequency/rep rate of 750 kHz. In the example of FIG. 3A, the output signal power of the VCSELs is increased (also described herein as "stepped") with the strobe windows 301-330 corresponding to increasing distance sub-ranges, such that more or maximum output signal power is used for the farther strobe windows/farther sub-ranges, as shown in the graph of FIG. 3B. That is, since the return signal pulse power decreases in square law fashion with increasing target distance range, the VCSEL power can be increased in a similar fashion to compensate. However, it will be understood that such operations for stepped increasing of VCSEL output power with distance sub-range is provided by way of example, and embodiments of the present disclosure are not limited to the configuration illustrated in FIGS. 3A and 3B. For example, while illustrated with respect to detector operation for the strobe windows 301-330 in numerical order or sequence (corresponding to increasing distance sub-ranges), it will be understood that the detectors may be operated for the strobe windows 301-330 in any order (e.g., non-sequential or even randomized), and the emitters operated accordingly.

In greater detail, FIG. 3A illustrates that, in a laser cycle (which, as noted above, refers to the time between laser pulses 315e), a VCSEL is pulsed or fired at the start of a temporal period, responsive to an emitter control signal. After a pre-determined delay, one or more SPADs of a detector array are activated for a strobe window by a strobe signal (e.g., with a duration corresponding to the pulse width of the strobe signal). The strobe windows define the times in the laser cycle where one or more SPADs are charged or activated to allow detection of photons. In the example of FIGS. 3A and 3B, there are X=30 different strobe windows 301 to 330, each corresponding to a respective portion or sub-range of the 200 m distance range. The strobe windows and associated sub-ranges can be mutually exclusive or overlapping, and can be ordered monotonically or not monotonically.

In addition, in FIGS. 3A and 3B, each image frame is divided into 30 image acquisition subframes, with output signal powers shown for laser pulses 315e during subframes 2, 8, and 20 by way of example. There may be about 10-3000 laser cycles in each sub frame in some embodiments, where each subframe collects data for a respective strobe window. For example, where X=30 strobe windows, the lidar system 100 may be operated to collect data for strobe window 301 (corresponding to a distance range of 0 to 10 m) over 1000 laser cycles, perform a strobe window readout operation, and then repeat this process for another strobe window (e.g., strobe window 302), until data has been collected for all 30 strobe windows to define a full image acquisition frame. It will be understood that, while illustrated by way of example as being performed in numerical order, acquisitions for the strobe windows 1 to X may be performed in any order; e.g., in the example above where X=30 strobe windows, data may be collected for strobe window 301, then strobe window 308, then strobe window 320, etc., until data for all 30 strobe windows 301 to 330 of the image frame have been acquired.

FIG. 3C is a graph illustrating the timings of image acquisition subframes (also referred to herein as subframes) that define a full image acquisition frame (also referred to herein as a full frame or frame). As shown in FIG. 3C, the full frame is divided into sequential subframes (1 to X), each imaging a different distance sub-range of the imaging distance range, and thus, each corresponding to respective strobe window 301-330. As noted above, each subframe may include data acquisition for multiple laser pulses (e.g., 10s, 100s or 1000s of laser pulses). The subframes may be equal or unequal in duration, and/or may be overlapping or non-overlapping with respect to the corresponding distance sub-ranges. For example, in some embodiments there may be an overlap in the distance sub-ranges imaged by consecutive subframes (e.g., Subframe 1 may correspond to a distance sub-range of 0 m to 12 m, while Subframe 2 may correspond to a distance sub-range of 10 m to 22 m).

The delay and/or duration of each of the strobe windows 301 to 330 relative to the period between laser pulses 315 may differ per image acquisition subframe. FIG. 3A depicts three image acquisition subframes (for strobe windows 2, 8, and 20) for purposes of illustration. The 'firing' of the VCSEL(s) (i.e., responsive to the emitter control signal(s)) and the charging of the SPAD(s) (i.e., responsive to the strobe signal(s)) for a particular strobe window is repeated for a pre-defined number of laser cycles (e.g., hundreds or thousands of laser cycles) per image acquisition subframe, in order to create a histogram for that strobe window (or to calculate the center of mass (CMM) in a CMM/in-pixel averaging implementation). In particular, each subframe may collect data for a respective strobe window, where each strobe window corresponds to a respective sub-range of the distance range that is based on the time period between the laser pulses 315e.

For example, the illustrated image acquisition subframe 2 may include 250 cycles (VCSEL firings and coordinated SPAD activations) for strobe window 302, which corresponds to a distance sub-range of 10 m to 17 m of the 200 m distance range. In a different strobe window (e.g., strobe window 308, which corresponds to a distance sub-range of 53-60 m), the delay between the laser pulse 315e and the arming or activation of the SPAD is different, the duration of the strobe window may be different, and/or the number of cycles per acquisition subframe may be different than one or more other strobe windows (e.g., the delay, duration, and/or number of laser cycles 315e for strobe window 308 may be different than those of strobe windows 302 or 320).

In embodiments of the present disclosure, the laser power level (i.e., the intensity of the laser pulse 315e) for two or more image acquisition subframes is also different, for example, based on the distance sub-range of the corresponding strobe window for which data is collected in the subframe. Still referring to the example of FIG. 3A, among the image acquisition subframes for strobe windows 302, 308, and 320, the respective power levels of the laser pulses 315e output from the VCSEL(s) is lower for strobe window 302 (which corresponds to a closer sub-range of 10-17 m), is at an intermediate power level for strobe window 308 (which corresponds to an intermediate sub-range of 53-60 m), and is higher for strobe window 320 (which corresponds to a farther sub-range). Also, since the strobe windows 301 to 330 are defined by operation of the detectors (in particular, in response to the strobe signals applied to the detectors) and not by the emitter control signals applied to the emitters (other than varying the output signal power per strobe window), some embodiments of the present disclosure can coordinate the timing of activation of different detector pixels during different strobe windows for the same laser cycle, which may be desirable (e.g., to distribute the current spikes that may be associated with charging the SPADs in time across the array). Although generally described herein with reference to two or three different power levels for two or three different strobe windows, it will be understood that embodiments of the present disclosure may include any combination of differently operating emitters for different strobe windows of detector operation.

Embodiments of the present disclosure may thus provide a more power efficient system. In particular, using the same example 10 fps and assumptions discussed above with reference to FIG. 8, that is, with the laser cycles per strobe=250, the VCSEL pw (pulse width)=10 ns, the peak power=65 kW, and the laser frequency/Rep rate=750 kHz, embodiments of the present disclosure may utilize a power scaling factor for operating the emitters that differs based on the strobe window of operation of the detectors. In the example of FIGS. 3A and 3B, the power scaling factor for strobe 1 may be 1/900, and for strobe 30 may be 900/900, of the total power. As such, the total output signal power of the emitters can be greatly reduced when averaged over a complete image acquisition frame of the detector elements, which may include respective subframes that each collect data for a respective strobe window that is repeated over hundreds or thousands of cycles of the emitter signals.

Embodiments of the present disclosure may thus perform operations for controlling emitters to output optical signals with higher power levels for strobe windows corresponding to farther distance sub-ranges. In some embodiments, the higher power levels may be achieved by increasing the peak drive current provided to the emitters, where the higher the peak current, the higher the optical power output. For example, the emitters 115e may be operated to provide lower power emission for subframes that image closer distance sub-ranges, and with increasing power to provide higher-power emission for subframes that image farther distance sub-ranges. In some embodiments, the higher power levels may be achieved by activating a higher density of emitters. For example, a greater number of the emitters in the array may be activated to provide maximum optical power output, or every other emitter in the array may be activated to provide one-half of the maximum optical power output. In some embodiments, the different power levels may be achieved in particular areas of the field of view by activating particular subsets or regions of emitters based on their relative positions in the array. For example, peripherally-facing emitters may be deactivated or "off" during strobe windows corresponding to farther distance ranges, providing narrower illumination with less power consumption for such farther distance ranges. Further embodiments described herein may include combining such operations for controlling emitter current, emitter density, and/or emitter regions.

In particular, further embodiments of the present disclosure are directed to LIDAR systems including emitter arrays that are configured to provide foveated illumination, that is, configured to vary the illumination over a field of view (FOV). Such embodiments may be based on recognition that, in some LIDAR applications, not all portions of the FOV may require the same imaging distance range.

Figure 4A:
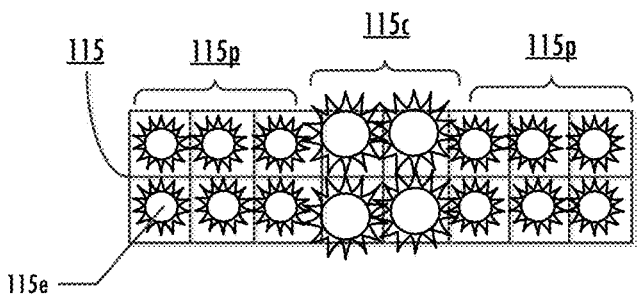
FIG. 4A illustrates example of operating a lidar emitter array to vary the operation of emitters at different regions of an emitter array for different strobe windows in accordance with some embodiments of the present disclosure.

FIG. 4A illustrates example operation of a LIDAR emitter array 115 to vary the operation of emitters at different regions for different strobe windows to provide foveated illumination in accordance with embodiments of the present disclosure. The emitters 115e of the emitter array 115 may be VCSELs in some embodiments. As shown in FIG. 4A, for an example 120° (horizontal)×30° (vertical) FOV (which may be divided into 15°×15° FOV regions or zones), a subset 115c of the emitters that are positioned in the array to output optical signals that illuminate a 30°×30° center region may be operated to image a 200 m distance range, while subsets 115p of the emitters that are positioned at peripheral regions of the array 115 may be operated to image a 100 m distance range. The different distance ranges may be based on the power and frequency of the optical signals provided by the respective emitters 115e (e.g., the pulsed lasers output from the VCSELs), the relative positions/arrangements of the emitters 115e that are arranged to illuminate the respective regions (e.g., based on in the relative positions in the emitter array 115), as well as on the timing of activation/deactivation of the detectors (e.g., the strobe windows of the SPADs).

Figure 4B:
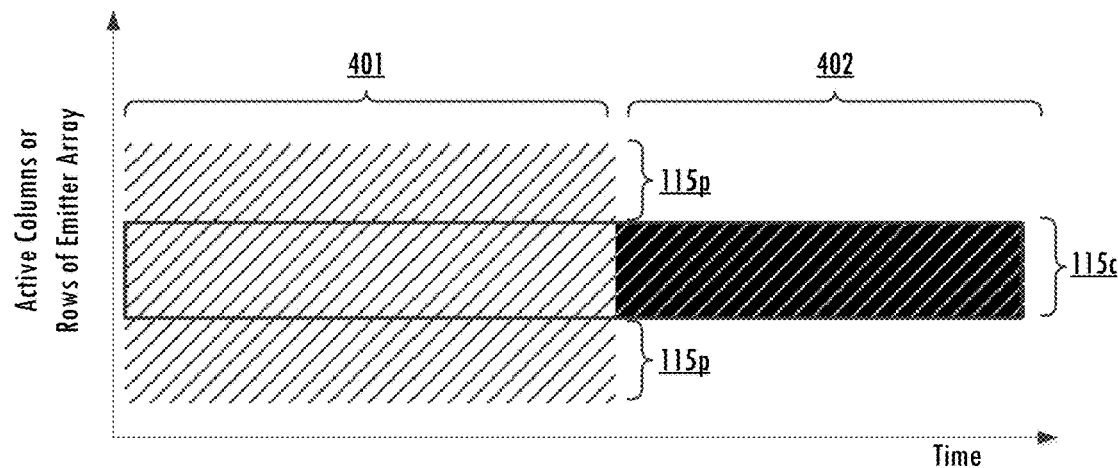
FIG. 4B illustrates example operation of a lidar emitter array to vary the operating density of emitters at different regions of an emitter array for different strobe windows to provide the illumination pattern of FIG. 4A in accordance with some embodiments of the present disclosure.

FIG. 4B illustrates example operation of a LIDAR emitter array 115 to vary the operating density of emitters at different regions of the array for different strobe windows over the time of an image acquisition frame, in accordance with some embodiments of the present disclosure. For instance, in embodiments including 30 different strobe windows as discussed in the examples above, a first subset 115p of the emitters arranged at regions of the emitter array corresponding to the peripheral FOV may be operated or activated to emit optical signals (e.g., responsive to respective emitter control signals) for only the image acquisition periods or subframes covering or corresponding to strobe windows 1 to 15 (e.g., to illuminate respective distance sub-ranges over a shorter 0 to 100 m distance range) for a subset of the full frame to provide a wider, peripheral field of illumination 401 at shorter distance sub-ranges. A second subset 115c of the emitters arranged at the center region of the emitter array 115 may be operated or activated to emit optical signals for the image acquisition subframes corresponding to all 30 strobe windows (e.g., to illuminate all of the respective distance sub-ranges over the full 0 to 200 m distance range) to provide a narrow, central field of illumination 402 at longer distance sub-ranges.

As such, in the example of FIG. 4B, emitters 115p positioned at the peripheral portions of the illuminator/emitter array 115 may be operated for about half the overall frame acquisition period (e.g., half of the number of subframes as the central portion), which may further reduce power consumption. Embodiments for foveated illumination as described herein can also be used in in parallel or in combination with the emitter output power stepping operations described above with reference to FIG. 3, as shown in FIG. 4C.

Figure 4C:
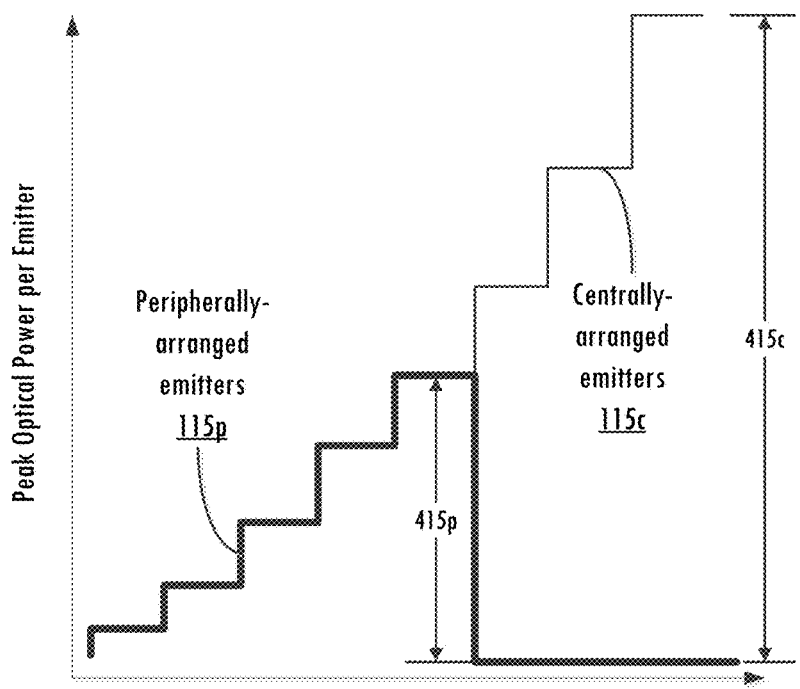
FIG. 4C illustrates example operation of a lidar emitter array to vary the output signal power of emitters at different regions of an emitter array for different strobe windows to provide the illumination pattern of FIG. 4A in accordance with some embodiments of the present disclosure.

FIG. 4C illustrates an example of varying the output signal power of emitters at different regions of the array for different strobe windows over the time of an image acquisition frame, in accordance with some embodiments of the present disclosure. As shown in the graph of FIG. 4C, the peak power from each VCSEL 115e and/or the density of activated VCSELs 115e may be scaled such that the optical power output of the emitter array 115 (and/or portions thereof) is varied for respective strobe windows/distance sub-ranges. For example, a subset 115p of the emitters positioned at peripheral regions of the emitter array may be operated to emit optical signals at a first power level or over a first range of power levels 415p (e.g., from low power (short range) to medium power (medium range)), while a subset 115c of the emitters positioned at a central region of the emitter array 115 may be operated to emit optical signals at a second power level or over a second range of power levels 415c (e.g., from low power (short range) to high power (long range)). Moreover, within its respective range of output power levels, an emitter may be controlled to provide higher power levels when the detectors are controlled to measure strobe windows corresponding to farther distance sub-ranges. That is, an individual emitter 115e may be operated with a respective range of power levels and for respective strobe windows of operation of the detector array based on its position in the emitter array 115.

For example, the centrally-positioned emitters 115c (which may face an intended direction of travel of an autonomous vehicle) may be configured to output optical signals over a range of output power levels 415c that is greater than a range of output power levels 415p of the peripherally-positioned emitters 115p (which may face to the left or to the right of the intended direction of travel). The emitters 115c may thus be operated to provide lower power emission for strobe windows or subframes that image closer distance sub-ranges, and with increasing power to provide higher-power emission for strobe windows or subframes that image farther distance sub-ranges. Also, as noted above, subsets of the emitters 115p may be deactivated (or operated at reduced power levels) during particular strobe windows (for example, for subframes that image farther distance sub-ranges). As such, the centrally-arranged emitters 115c are activated to emit light for all of the strobe windows corresponding to the 200 m distance range, as well as to provide lower power emission for the strobe windows corresponding to 0 to 100 m, and to provide higher power emission for the strobe windows corresponding to 100 to 200 m.

Likewise, a first subset of the pixels of the detector array 110 that are configured to image the center region of the FOV may be operated for a first set of strobe windows (e.g., including strobe windows corresponding to respective sub-ranges over a longer distance range (from near range to long range)), while a second subset of the pixels of the detector array that are configured to image the periphery of the FOV may be operated for a second set of strobe windows (e.g., including strobe windows corresponding to respective sub-ranges over a shorter distance range (from near range to medium range)). Such detector operations are described in greater detail in U.S. Provisional Patent Application No. 62/908,801 entitled "Strobe Based Configurable 3D Field of View LIDAR System" filed Oct. 1, 2019, in the United States Patent and Trademark Office, the disclosure of which is incorporated by reference herein in its entirety.

Additionally or alternatively, the portions or regions of the emitter array arranged to illuminate the shorter distance range (e.g., peripherally-arranged emitters 115p) may be operated to emit optical signals at a fraction of the peak power (half of the peak power in the example of FIG. 4C) and/or to emit optical signals at a higher frequency (corresponding to a shorter imaging range) as compared to the portions or regions of the emitter array arranged to illuminate the longer distance range (e.g., centrally-arranged emitters 115c), and the strobe window sequence for the portions arranged to illuminate the shorter distance range may be repeated multiple times per frame (e.g., the subframes and associated emitter operation for strobe windows 1 to 15 may be repeated twice in a frame, replacing strobe windows 11 to 30). For example, the peripherally-arranged emitters 115p may be controlled by respective driver circuits to emit optical signals at a higher frequency corresponding to a 0 to 100 m distance range, while the centrally-arranged emitters 115c may be controlled by respective driver circuits to emit optical signals at a lower frequency corresponding to a 0 to 200 m distance range. As another alternative, each of the strobe windows corresponding to the shorter distance range may be longer in duration (e.g., the durations of strobe windows 1 to 15 may be twice as long).

Figure 5A:
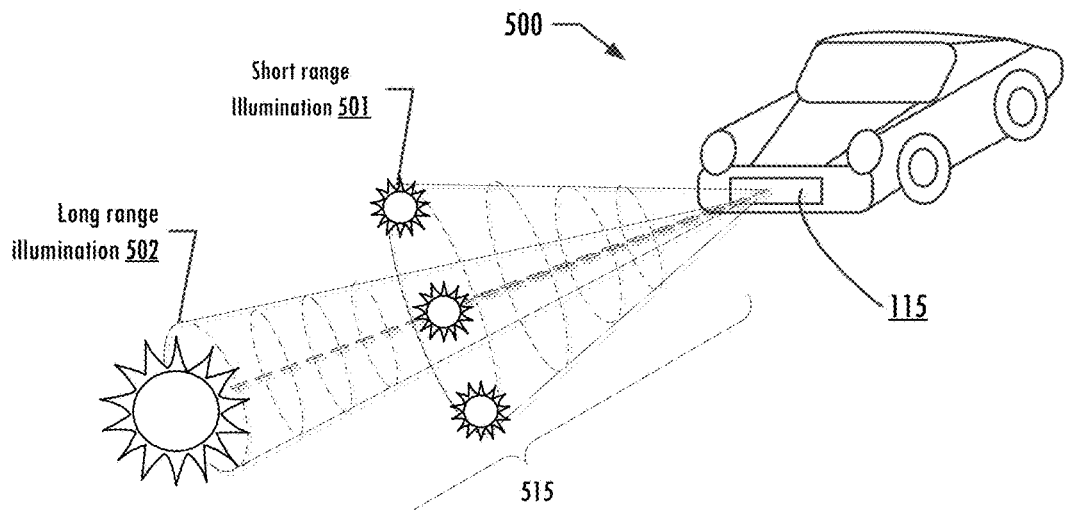
FIG. 5A is a diagram illustrating an example automotive lidar system that is configured to provide strobe window dependent illumination patterns in accordance with some embodiments of the present disclosure.
Figure 5B:
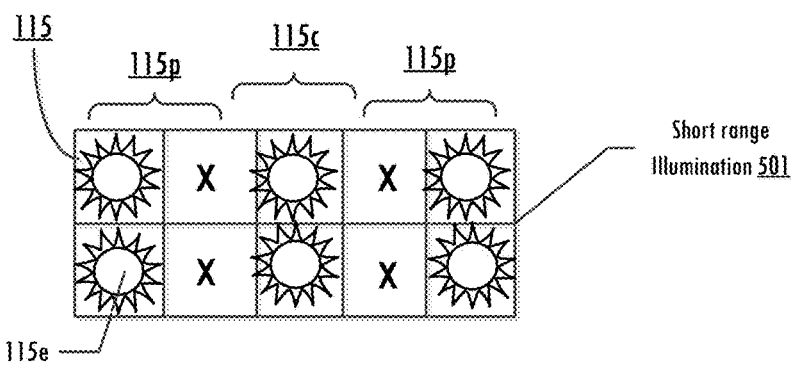
FIGS. 5B, 5C, and 5D are diagrams illustrating examples of illumination control schemes that may be used to achieve the illumination pattern of FIG. 5A in accordance with some embodiments of the present disclosure.
Figure 5C:
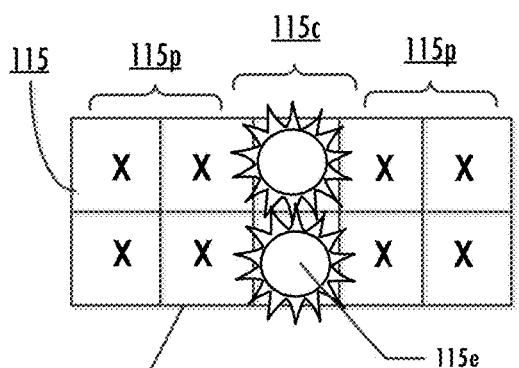
Figure 5D:
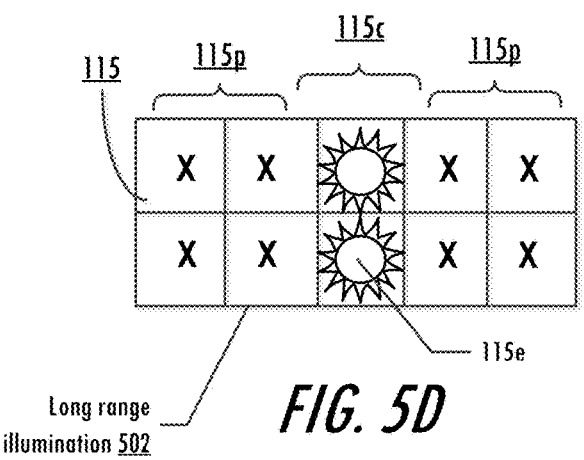

FIG. 5A is a diagram illustrating an example vehicular lidar application that provides strobe window dependent emitter control in accordance with some embodiments of the present disclosure. FIGS. 5B, 5C, and 5D are diagrams illustrating examples of illumination control schemes that may be used to achieve the illumination of FIG. 5A during strobe windows corresponding to different distance sub-ranges. FIGS. 5A to 5D are illustrated with reference to a vehicular lidar applications, but it will be understood that embodiments of the present disclosure are not limited thereto.

As shown in FIG. 5A, in a vehicular lidar application 500, it may be advantageous to provide an illumination pattern 515 that images a longer/farther distance in one direction (e.g., 200 m ahead in direction of travel) in a narrower FOV 502, but images a shorter/closer distance (e.g., 100 m) in a wider FOV 501. As such, in some embodiments, different portions of the FOV may be specified to have different range requirements, and the lidar emitters and/or detectors may be operated accordingly (e.g., to reduce power or turn off the wider-facing emitters of the array for strobe windows corresponding to farther distance ranges).

The emitter array 115 may be driven by an addressable driver circuit 116 as shown in FIG. 1, which can control operation of the individual emitters 115e to perform operations including, but not limited to activation of portions or sectors or regions of the emitter array (e.g., activating emitters in central sectors or all sectors of the emitter array 115), control of the density of activation of the emitters (e.g., activation of all emitters in the array 115 for maximum power density, or every other emitter for one half the power density), and/or control of the peak current driven to the emitters at one or more optical emission power levels (e.g., the higher the peak current, the higher the optical emission power from each emitter, up to a roll-over current level (which refers to the point beyond which optical emission power may decrease with further increases in drive current)). For example, the field of illumination and power density of the optical signals emitted by the emitter array 115 can be changed or varied on a per strobe window basis, allowing for control and redirection the available power towards the region of interest to increase system efficiency.

As shown in FIGS. 5B, 5C, and 5D, subsets of the emitters 115e of the emitter array 115 may be deactivated and/or operated at different power levels for particular strobe windows (e.g., for strobe windows corresponding to distance sub-ranges where a narrower field of view is desired), thereby creating a 2-dimensional field of illumination that varies (e.g., between 501 and 502) as a function of strobe window. In particular, FIG. 5B illustrates an example of operating the emitter array 115 for a first set of strobe windows corresponding to shorter (or 'closer') distance sub-ranges. As shown in FIG. 5B, both the subset 115c of emitters arranged at central regions and the subset 115p of emitters arranged at peripheral regions of the array 115 may be operated to provide a pattern 501 that illuminates a relatively wide FOV with a lower power level or density (illustrated by the relatively smaller starburst patterns). For example, the emitter array 115 of the system 500 may be operated to emit light with lower power output for strobe windows corresponding to closer distance sub-ranges (e.g., 0 to 100 m) of a 200 m imaging distance range.

FIGS. 5C and 5D illustrate examples of operating the emitter array 115 for a second set of strobe windows corresponding to longer (or 'farther') distance sub-ranges. As shown in FIG. 5C, only a subset 115c of the emitters may be operated to provide a different pattern 502 that illuminates a narrower, central portion of the FOV with a higher power level or density (illustrated by the relatively larger starburst patterns), for example, to provide greater illumination for strobe windows corresponding to farther distance sub-ranges (e.g., 100 m to 200 m) of the 200 m imaging distance range. Another subset of the emitters 115p (at the peripheral portions of the array 115) are not activated or switched off (illustrated by "x"). This may provide lower power consumption than activating all of the emitters of the array 115 for such farther distance sub-ranges, where the narrower FOV 502 may be sufficient to provide accurate imaging. Alternatively, as shown in FIG. 5D, the subset of the emitters 115c that are centrally located in the array 115 may be switched on to provide a pattern that illuminates the narrower, central portion of the FOV with the lower power level or density (illustrated by the relatively smaller starburst patterns) to further reduce power consumption, while the subsets 115p of the emitters that are outside or otherwise not positioned to illuminate the narrower FOV 502 can likewise be switched off.

As shown in the examples of FIGS. 5B to 5D, emission per unit angle may be controlled by the peak current with which the emitter elements illuminating that particular angle are driven, by enabling only a subset of the emitter elements that are arranged in subregions of the emitter array 115 to illuminate that particular angle, or by a combination of both methods. It will be understood that, in some instances, only controlling or changing the drive current may not be sufficient to achieve a sufficient dynamic range (e.g., 1:900 in the case of 30 strobe windows) because at a sufficiently small current, the VCSELs may enter a subthreshold region. It will also be understood that only activating a portion or subset of the emitter array 115 may also not achieve the desired dynamic range (e.g., if there are fewer than 900 VCSELs per emitter element). Therefore, a combination of controlling the drive current and activating or enabling subsets of the emitters 115e may be used.

Although illustrated in FIGS. 4A-4C and 5A-5D with reference to control of the emitter array 115 to vary the optical signal emission by centrally-positioned emitter subsets 115c and peripherally-positioned emitter subsets 115p to provide specific illumination patterns 501 and 502, it will be understood that these illumination patterns 501, 502 are provided for purposes of illustration rather than limitation, and that emitter subsets at various regions of the emitter array 115 can be differently operated to provide different and dynamically varying combinations of short-range FOVs and long range FOVs for different strobe windows/distance subranges. Operating subsets of the emitters to reduce emission power in one or more directions (or to prevent full power emissions in all directions) can significantly reduce the power consumption of the lidar system.

Foveated illumination as described herein can also be combined with a spatially distributed strobing scheme (e.g., "zonal illumination"). For example, the emitter array 115 may be controlled to selectively emit optical signals per cluster of emitters 115e or per zone/region of the emitter array 115 at different times and/or with different power levels per cluster or per zone, to provide spatially varying power patterns. That is, respective control signals may be generated to selectively operate different subsets of the emitter elements 115e to emit respective optical signals with different timing (e.g., corresponding to different strobe windows of the detector elements) and/or to emit respective optical signals with different power levels. In some embodiments, the detectors 110d of the detector array 110 may be operated responsive to spatially distributed strobes to match the spatially distributed emitter power. Also, some detectors 110d or regions of the detector array 110 may be operated to detect photons over short distance sub-ranges/closer strobe windows, while others may be operated to detect photons long distance sub-ranges/farther strobe windows simultaneously, which may allow increasing the system frame rate, albeit at the cost of resolution.

Figure 6:
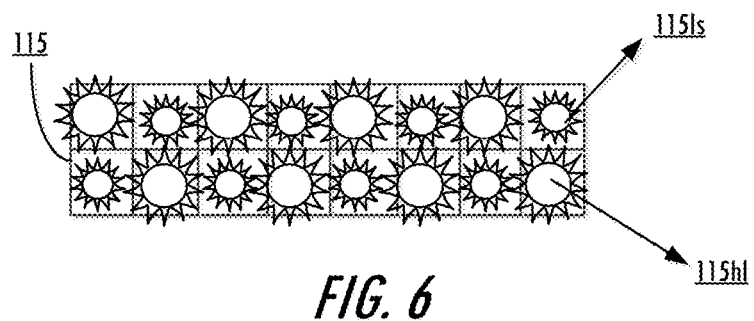
FIG. 6 is a diagram illustrating example operation of a lidar emitter array to vary the operation of respective regions or subsets of emitters for different strobe windows to provide spatially varying power patterns in accordance with embodiments of the present disclosure.

FIG. 6 illustrates an example emitter array 115 having respective regions or subsets of emitters 115e that are controlled in a "checkered" illumination pattern over the FOV, such that a first subset of emitters 115ls positioned at a first region/locations of the emitter array 115 output optical signals for image acquisition subframes that collect data for closer strobe windows (i.e., strobe windows corresponding to closer distance sub-ranges) with lower emitter power, while a second subset of emitters 115hl positioned at a different second region/locations of the emitter array 115 output optical signals for image acquisition subframes that collect data for farther strobe windows (i.e., strobe windows corresponding to farther distance sub-ranges) with higher emitter power. For example, the emitter array 115 may include emitters that are configured to be operated at different power levels, with some emitters 115hl optimized or otherwise configured for higher power and longer range operation, interlaced with other emitters 115ls optimized or otherwise configured for lower power shorter range operation.

To provide the illumination pattern shown in FIG. 6, a first subset of the emitters 115ls may be operated or activated to emit optical signals at a first, lower power level for the closer strobe windows (e.g., to illuminate respective distance sub-ranges over a shorter 0 to 100 m distance range), and may be deactivated (or operated at a lower, non-zero power level) for the farther strobe windows. Conversely, a second subset of the emitters 115hl may be operated or activated to emit optical signals at a second, higher power level for the farther strobe windows (e.g., to illuminate the respective distance sub-ranges over the 100 to 200 m distance range), but may be deactivated (or operated at a lower, non-zero power level) for the closer strobe windows. However, it will be understood that the spatial distribution shown in FIG. 6 is provided by way of example, and that spatial distributions of emitter power in accordance with embodiments of the present disclosure are not restricted to any particular configuration or pattern.

Figure 9A:
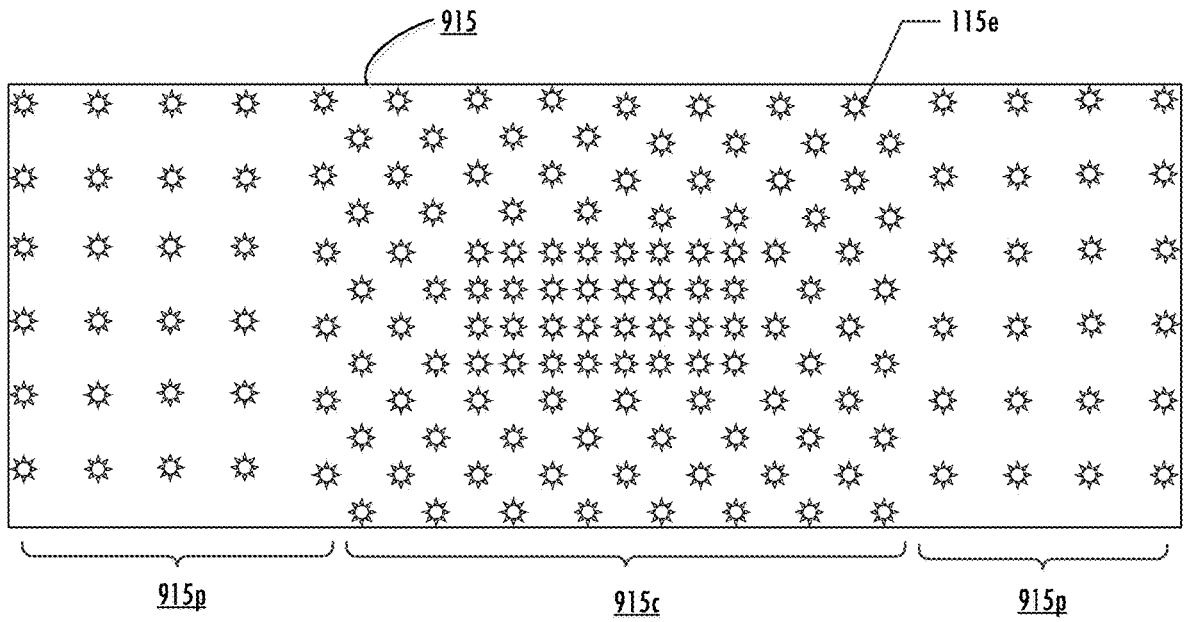
FIGS. 9A-9D are diagrams illustrating examples of illumination control schemes in emitter arrays with varying emitter density accordance with some embodiments of the present disclosure.
Figure 9B:
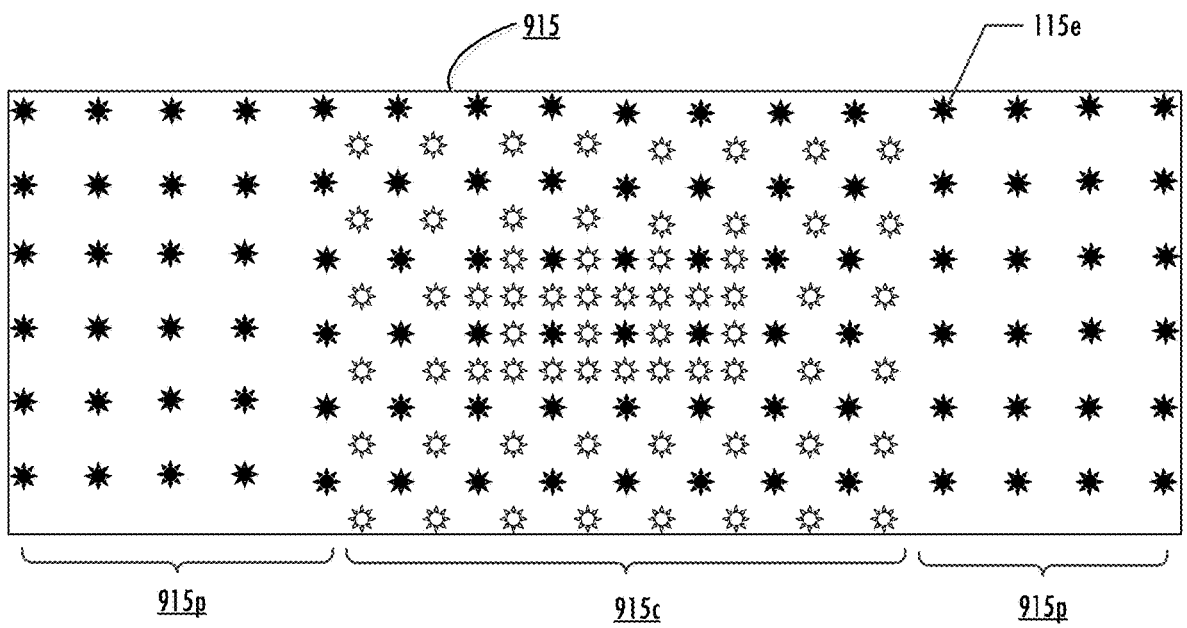
Figure 9C:
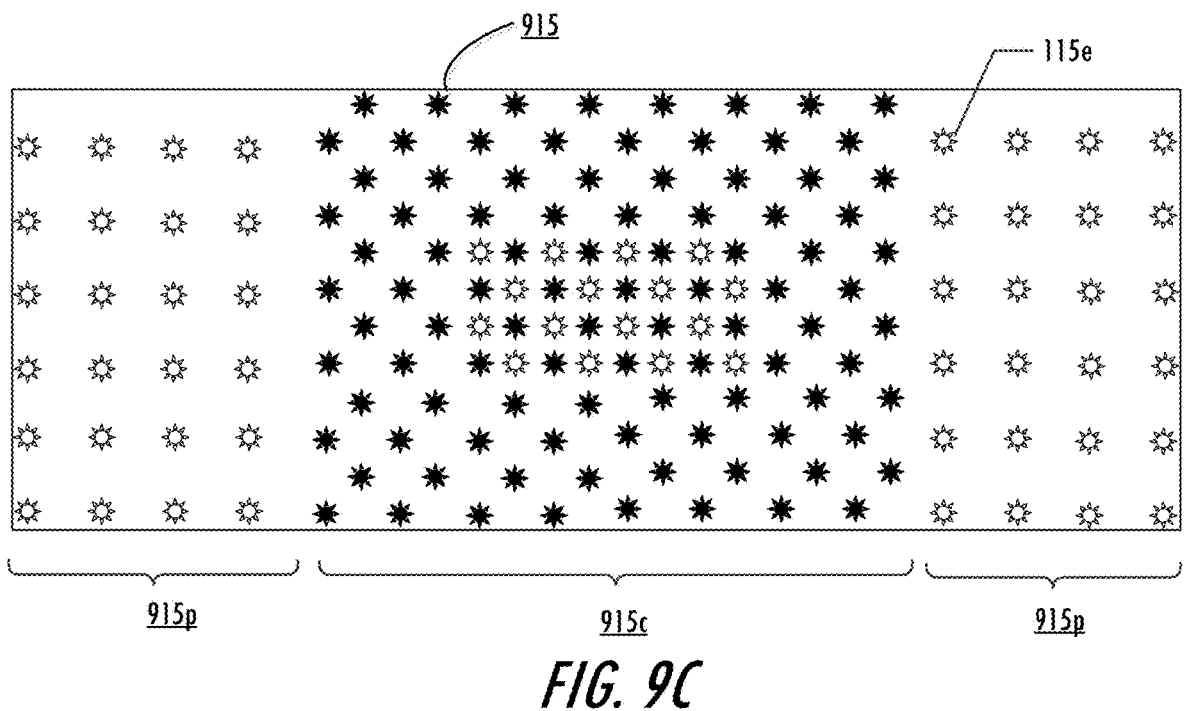
Figure 9D:
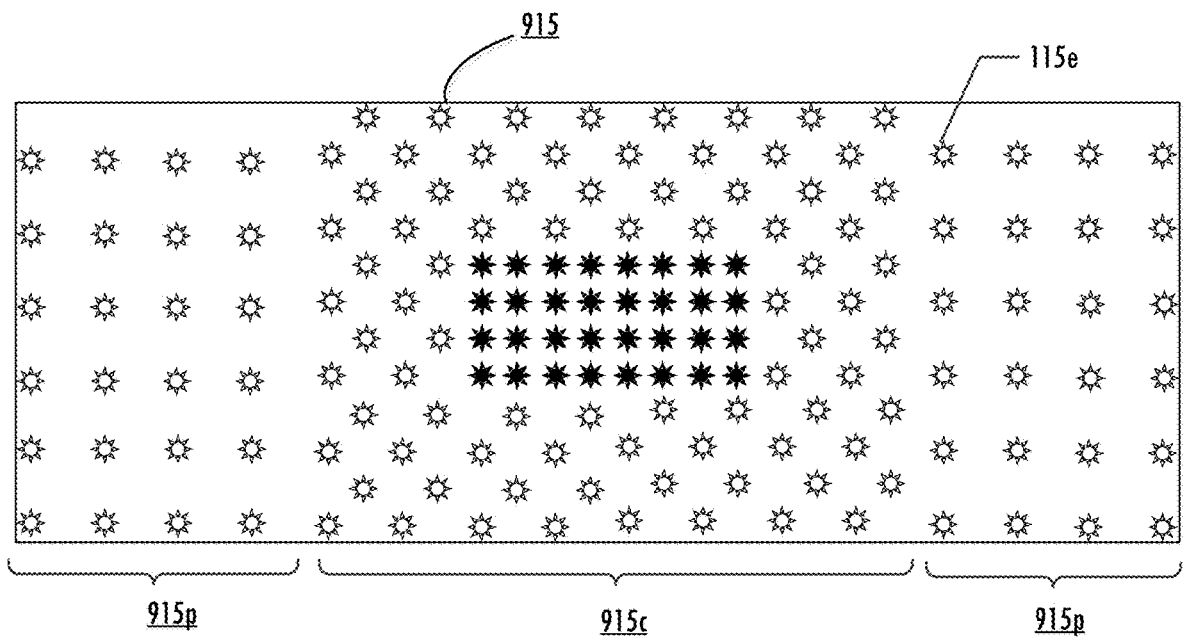

FIGS. 9A-9D are diagrams illustrating an examples of an emitter array including emitters positioned or populated in the array with varying density and related illumination control schemes in accordance with some embodiments of the present disclosure. As shown in FIG. 9A, an emitter array 915 includes a plurality of emitters 115e arranged to provide a foveated emitter density, with a greater density of emitters 115e at the central region 915c as compared to the peripheral regions 915p of the array 915. FIGS. 9B, 9C, and 9D illustrate different operation of subsets of the emitters 115e of the emitter array 915 of FIG. 9A for different strobe windows, with active emitters and associated illumination patterns illustrated by darkened starburst patterns.

In particular, FIG. 9B illustrates operation of the emitter array 915 for a first strobe window (or a first set of strobe windows) corresponding to shorter or closer distance sub-ranges (e.g., 0 to 67 m of a 200 m imaging distance range). As shown in FIG. 9B, all of the emitters 115e arranged at the peripheral regions 915p of the array 915, along with a first subset of the emitters 115e arranged at the central region 915c of the array 915, may be operated to emit optical signals to provide a first emission pattern that illuminates relatively wide FOV, in some embodiments with a relatively lower power level (as compared to FIGS. 9C and 9D). FIGS. 9C and 9D illustrate operations of the emitter array 915 for a second strobe window/set of strobe windows corresponding to mid- or medium distance sub-ranges (e.g., 67 to 133 m of a 200 m imaging distance range) and for a third strobe window/set of strobe windows corresponding to longer or farther distance sub-ranges (e.g., 133 to 200 m of a 200 m imaging distance range). As shown in FIG. 9C, a second subset of the emitters 115e at the central region 915c of array 915 may be operated to emit optical signals (with the emitters 115e arranged at the peripheral regions 915p inactive) to provide a different, second emission pattern that illuminates a narrower, central portion of the FOV, in some embodiments with a mid-range power level (as compared to FIGS. 9B and 9D). As shown in FIG. 9D, a still smaller third subset of the emitters 115e at the central region 915c of array 915 may be operated to emit optical signals to provide a different, third emission pattern that illuminates an even narrower portion of the FOV, in some embodiments with a relatively higher power level (as compared to FIGS. 9B and 9C).

That is, the more densely-populated emitters 115e in the central region 915c of the array 915 may be configured to emit optical signals with the highest power for longer distance subranges, and the array 915 may have reduced emitter density towards the peripheral regions 915p, to provide foveated imaging. For shorter range strobe windows, a subset of the emitters 115e at the central region 915c may be operated to provide a more sparse illumination pattern along with the emitters 115e at the peripheral regions 915p to image a wide field of view. For mid-range strobe windows, more of the densely positioned emitters 115e at the central region 915c may be operated to provide a narrower field of view, and for longer range strobe windows a smaller subset of the densely positioned emitters 115e at the central region 915c may be operated to provide more intensely focused illumination as strobe windows progress to farther distance subranges.

Figure 10A:
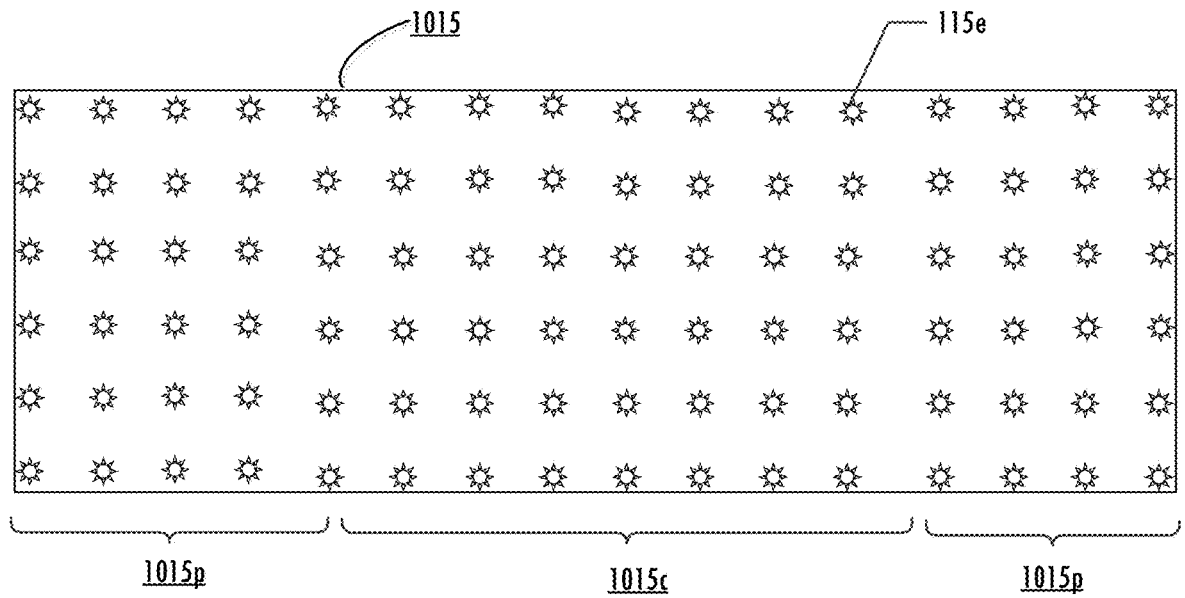
FIGS. 10A-10D are diagrams illustrating examples of illumination control schemes in emitter arrays with uniform emitter density in accordance with some embodiments of the present disclosure.
Figure 10B:
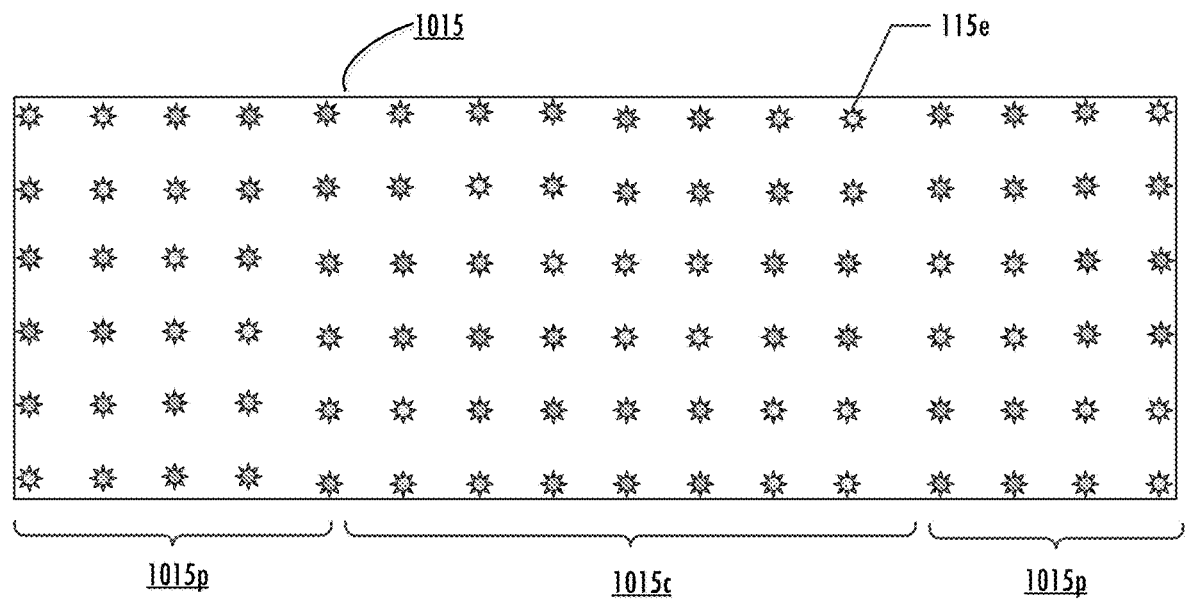
Figure 10C:
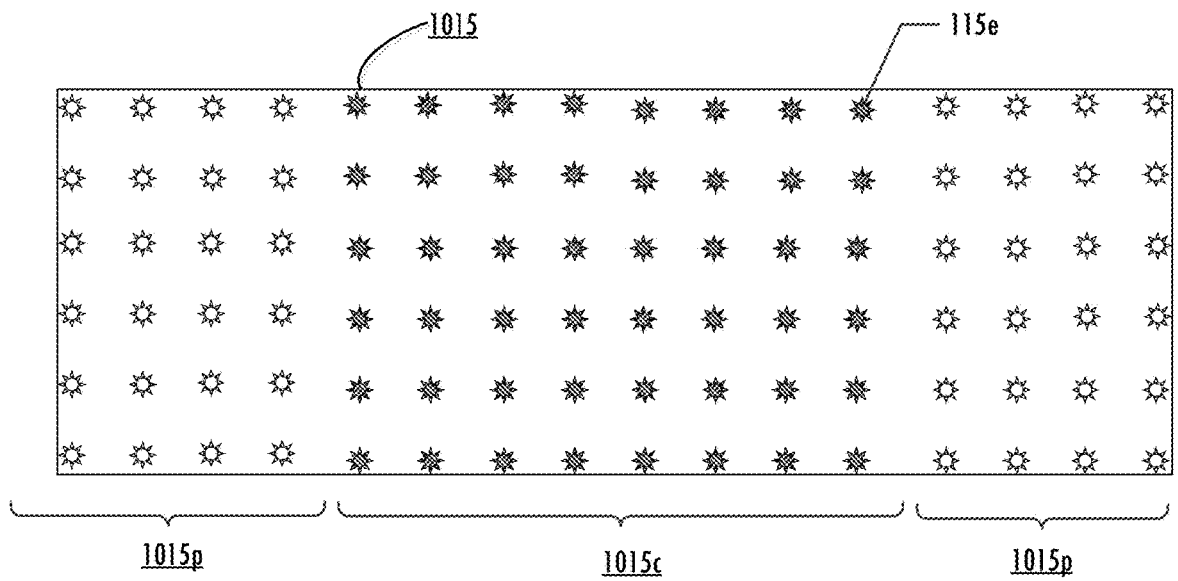
Figure 10D:
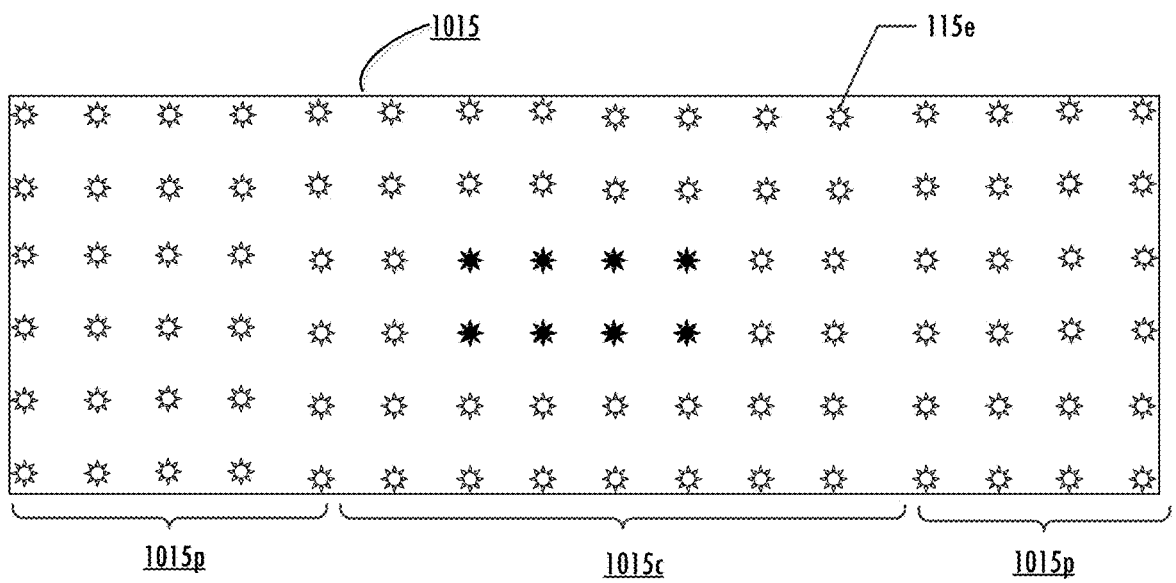

FIGS. 10A-10D are diagrams illustrating an examples of an emitter array including emitters positioned or populated in the array with uniform density and related illumination control schemes in accordance with some embodiments of the present disclosure. As shown in FIG. 10A, an emitter array 1015 includes a plurality of emitters 115e arranged in a substantially uniform distribution in the center 1015c and peripheral 1015p regions of the array 1015. FIGS. 10B, 10C, and 10D illustrate different operation of subsets of the emitters 115e of the emitter array 1015 of FIG. 10A to provide foveated illumination for different strobe windows, with active emitters and associated illumination patterns illustrated by shaded or darkened starburst patterns.

In particular, FIG. 10B illustrates operation of the emitter array 1015 for a first strobe window/set of strobe windows corresponding to shorter or closer distance sub-ranges (e.g., 0 to 67 m of a 200 m imaging distance range). As shown in FIG. 10B, a majority or all of the emitters 115e of the array 1015 may be operated to emit optical signals with a relatively lower power level (as compared to FIGS. 10C and 10D) to provide a first emission pattern that illuminates relatively wide FOV. FIGS. 10C and 10D illustrate operations of the emitter array 1015 for a second strobe window/set of strobe windows corresponding to mid- or medium distance sub-ranges (e.g., 67 to 133 m of a 200 m imaging distance range) and for a third strobe window/set of strobe windows corresponding to longer or farther distance sub-ranges (e.g., 133 to 200 m of a 200 m imaging distance range). As shown in FIG. 10C, a subset of the emitters 115e at the central region 1015c of array 1015 may be operated to emit optical signals with a mid-range power level (as compared to FIGS. 10B and 10D) (with the emitters 115e arranged at the peripheral regions 1015p inactive) to provide a different, second emission pattern that illuminates a narrower, central portion of the FOV. As shown in FIG. 10D, a still smaller subset of the emitters 115e at the central region 1015c of array 1015 are operated to emit optical signals with a relatively higher power level (as compared to FIGS. 10B and 10C) to provide a different, third emission pattern that illuminates an even narrower portion of the FOV.

It will be understood that emitters and/or detectors that are configured to operate according to the examples described herein operate based on respective control signals (such as emitter control signals and detector strobe signals) generated by one or more associated control circuits, such as a sequencer circuit that may coordinate operation of the emitter array and detector array. That is, the respective control signals may be configured to control temporal and/or spatial operation of individual emitter elements of the emitter array and/or individual detector elements of the detector array in coordination to provide functionality as described herein.

Embodiments of the present disclosure may be used in conjunction with operations for varying the number or rate of readouts based on detection thresholds, as described for example in U.S. patent application Ser. No. 16/733,463 entitled "High Dynamic Range Direct Time of Flight Sensor with Signal-Dependent Effective Readout Rate" filed Jan. 3, 2020, the disclosure of which is incorporated by reference herein. For example, a power level of the emitter signals may be reduced in response to one or more readouts that are based on fewer cycles of the emitter signals (indicating a closer and/or more reflective target), or the power level of the emitter signals may be increased in response to one or more readouts that are based on more cycles of the emitter signals (indicating farther and/or less reflective targets).

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication Nos. 2018/0301872 entitled "Ultra-Small Vertical Cavity Surface Emitting Laser (VCSEL) and Arrays Incorporating the Same," to Burroughs et al. and 2018/0301875 entitled "Devices with Ultra-Small Vertical Cavity Surface Emitting Laser Emitters Incorporating Beam Steering," to Burroughs et al., both filed Apr. 12, 2018, the disclosures of which are incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

The invention claimed is:

1. A Light Detection And Ranging (LIDAR) system, comprising:
   one or more emitter elements operable to emit optical signals responsive to respective emitter control signals;
   one or more detector elements operable to detect incident photons for respective strobe windows of operation, wherein the respective strobe windows of operation are between pulses of the optical signals and are at respective delays that differ with respect to the pulses; and
   at least one control circuit configured to generate the respective emitter control signals to differently operate the one or more emitter elements based on the respective delays of the respective strobe windows of operation of the one or more detector elements.

2. The LIDAR system of claim 1, wherein the respective emitter control signals operate the one or more emitter elements to emit the optical signals at a first power level for a first strobe window of the respective strobe windows, and to emit the optical signals at a second power level for a second strobe window of the respective strobe windows,
   and wherein the at least one control circuit is configured to generate the respective emitter control signals independent of detection signals output from the one or more detector elements.

3. The LIDAR system of claim 2, wherein the first strobe window corresponds to a closer sub-range of a distance range that that is based on a time between the pulses of the optical signals than the second strobe window, and wherein the second power level is greater than the first power level.

4. The LIDAR system of claim 1, wherein the one or more emitter elements comprise first and second subsets of emitter elements, and wherein the respective emitter control signals operate the first subset to emit the optical signals for a first strobe window of the respective strobe windows, and operate the second subset to emit the optical signals for a second strobe window of the respective strobe windows.

5. The LIDAR system of claim 4, wherein the first and second subsets are positioned at different regions of an emitter array and/or comprise different densities of the emitter elements.

6. The LIDAR system of claim 5, wherein the respective emitter control signals operate the first subset to emit the optical signals having a first power level for the first strobe window, and operate the second subset to emit the optical signals having a second power level for the second strobe window, wherein the second power level is greater than the first power level.

7. The LIDAR system of claim 6, wherein the first strobe window corresponds to a closer sub-range of a distance range that that is based on a time between the pulses of the optical signals than the second strobe window, and wherein the second subset comprises fewer of the emitter elements than the first subset.

8. The LIDAR system of claim 7, wherein the first subset comprises emitter elements that are positioned at a peripheral region of the emitter array, and wherein the second subset comprises emitter elements that are positioned at a central region of the emitter array.

9. A Light Detection And Ranging (LIDAR) system, comprising:
   at least one control circuit configured to output respective emitter control signals to operate one or more emitter elements to emit first optical signals at a first power level for a first strobe window of operation of one or more detector elements, and to emit second optical signals at a second power level, different than the first power level, for a second strobe window of operation of the one or more detector elements, based on respective delays of the first and second strobe windows with respect to pulses of the first and second optical signals, respectively,
   wherein the respective delays of the first and second strobe windows correspond to respective sub-ranges of a distance range that is based on a time between the pulses of the first or second optical signals.

10. The LIDAR system of claim 9, wherein the first strobe window corresponds to a closer sub-range of the respective sub-ranges than the second strobe window, and wherein the second power level is greater than the first power level.

11. The LIDAR system of claim 10, wherein the one or more emitter elements comprise first and second subsets of emitter elements, and wherein the respective emitter control signals operate the first subset to emit the first optical signals at the first power level for the first strobe window, and operate the second subset to emit the second optical signals at the second power level for the second strobe window,
   and wherein the at least one control circuit is configured to generate the respective emitter control signals independent of detection signals output from the one or more detector elements.

12. The LIDAR system of claim 11, wherein the first and second subsets are positioned at different regions of an emitter array and/or comprise different densities of the emitter elements.

13. The LIDAR system of claim 11, wherein the second subset comprises fewer of the emitter elements than the first subset.

14. A Light Detection And Ranging (LIDAR) system, comprising:
   at least one control circuit configured to output respective emitter control signals to operate a first subset of emitter elements of an emitter array to emit first optical signals for a first strobe window of operation of one or more detector elements, and to operate a second subset of the emitter elements, different than the first subset, to emit second optical signals for a second strobe window of operation of the one or more detector elements, based on respective delays of the first and second strobe windows with respect to pulses of the first and second optical signals, respectively,
   wherein the respective delays of the first and second strobe windows correspond to respective sub-ranges of a distance range that is based on a time between the pulses of the first or second optical signals.

15. The LIDAR system of claim 14, wherein the first subset comprises emitter elements positioned at a first region of the emitter array, and wherein the second subset comprises emitter elements positioned at a second region of the emitter array that is different from the first region.

16. The LIDAR system of claim 15, wherein the first region comprises a peripheral region, and wherein the second region comprises a central region.

17. The LIDAR system of claim 14, wherein the respective emitter control signals are configured to operate the first subset of the emitter elements to emit the first optical signals at a first power level, and to operate the second subset of the emitter elements to emit the second optical signals at a second power level, and wherein the at least one control circuit is configured to generate the respective emitter control signals independent of detection signals output from the one or more detector elements.

18. The LIDAR system of claim 17, wherein the first strobe window corresponds to a closer sub-range of the respective sub-ranges than the second strobe window, and wherein the second power level is greater than the first power level.

19. The LIDAR system of claim 18, wherein the second subset comprises fewer of the emitter elements than the first subset.

20. The LIDAR system of claim 1, wherein the LIDAR system is a flash LIDAR system that is configured to be coupled to an autonomous vehicle such that the one or more emitter elements and the one or more detector elements are oriented relative to an intended direction of travel of the autonomous vehicle.

* * * * *